United States Patent
Ohki

(10) Patent No.: US 11,457,118 B2
(45) Date of Patent: Sep. 27, 2022

(54) INFORMATION PROCESSING APPARATUS, IMAGE FORMING APPARATUS, INFORMATION PROCESSING SYSTEM, ATTRIBUTE IDENTIFICATION METHOD, AND RECORDING MEDIUM

(71) Applicant: KONICA MINOLTA, INC., Tokyo (JP)

(72) Inventor: Kenichiro Ohki, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 143 days.

(21) Appl. No.: 16/989,935

(22) Filed: Aug. 11, 2020

(65) Prior Publication Data
US 2021/0058530 A1   Feb. 25, 2021

(30) Foreign Application Priority Data

Aug. 21, 2019  (JP) .............................. JP2019-150895

(51) Int. Cl.
*G06F 15/173* (2006.01)
*H04N 1/32* (2006.01)
(Continued)

(52) U.S. Cl.
CPC ..... *H04N 1/32101* (2013.01); *H04L 67/1044* (2013.01); *H04L 67/303* (2013.01); *H04L 67/306* (2013.01); *H04N 1/32368* (2013.01)

(58) Field of Classification Search
CPC .. H04L 67/303; H04L 67/306; H04L 67/1044
(Continued)

(56) References Cited

U.S. PATENT DOCUMENTS

2013/0254152 A1* 9/2013 Zhang ................ G06Q 30/0631 706/46
2019/0205698 A1* 7/2019 Liu ......................... G06F 16/907
2020/0304587 A1* 9/2020 Guo ......................... H04L 67/06

FOREIGN PATENT DOCUMENTS

| JP | 3254422 B2 | 11/2001 |
| JP | 2011191614 A | 9/2011 |
| JP | 2017126215 A | 7/2017 |

OTHER PUBLICATIONS

Office Action dated Jan. 19, 2021 issued in corresponding Japanese Patent Application No. 2019-150895, with English translation (5 pages).

* cited by examiner

*Primary Examiner* — Wing F Chan
*Assistant Examiner* — Andrew Woo
(74) *Attorney, Agent, or Firm* — Buchanan Ingersoll & Rooney PC

(57) ABSTRACT

An information processing apparatus connected to one or more user terminals including a first user terminal installed at a place of a social group, via a communication network, includes: a storage that stores social group attribute information that associates a unique ID uniquely identifying the first user terminal with attribute information pertaining to the social group where the first user terminal assigned the unique ID is installed; and a hardware processor, wherein the hardware processor obtains information pertaining to the first user terminal and including the unique ID, the information having been transmitted from the first user terminal, obtains the attribute information pertaining to the social group associated in the storage with the unique ID transmitted from the first user terminal, and identifies a social group attribute of the user of the first user terminal.

18 Claims, 12 Drawing Sheets

(51) Int. Cl.
 *H04L 67/104* (2022.01)
 *H04L 67/306* (2022.01)
 *H04L 67/303* (2022.01)
(58) Field of Classification Search
 USPC ........................................................ 709/223
 See application file for complete search history.

FIG.3

SOCIAL GROUP ATTRIBUTE INFORMATION

| UNIQUE ID | CONTRACTING PARTY INFORMATION | VARIOUS DISCLOSED DATA ITEMS |
|---|---|---|// 
| | | |

FIG.4

FIRST HISTORY INFORMATION

| UNIQUE ID | IP ADDRESS | LOG INFORMATION (USER INFORMATION, PRINT CONTENT) | DATE AND TIME |
|---|---|---|---|
| | | | |

FIG.5

SECOND HISTORY INFORMATION

| IP ADDRESS | DEVICE FINGERPRINT | LOG INFORMATION (CONNECTION URL, CONTENT ATTRIBUTE, REGISTRATION INFORMATION) | DATE AND TIME |
|---|---|---|---|
| | | | |

FIG.6

CONVERSION INFORMATION

| UNIQUE ID | IP ADDRESS | DATE AND TIME |
|---|---|---|
| | | |

FIG.7

INTEGRATED HISTORY INFORMATION

| DATE AND TIME | UNIQUE ID | IP ADDRESS | CONTRACTING PARTY INFORMATION | VARIOUS DISCLOSED DATA ITEMS | LOG INFORMATION |
|---|---|---|---|---|---|
| | | | | | |

FIG.8

DISTRIBUTION INFORMATION

| CATEGORY | DISTRIBUTION CONDITION | DISTRIBUTION INFORMATION |
|---|---|---|
| | | | ial identi1fication method, and a recording medium.

INFORMATION PROCESSING APPARATUS, IMAGE FORMING APPARATUS, INFORMATION PROCESSING SYSTEM, ATTRIBUTE IDENTIFICATION METHOD, AND RECORDING MEDIUM

CROSS-REFERENCE TO RELATED APPLICATIONS

The entire disclosure of Japanese Patent Application No. 2019-150895 filed on Aug. 21, 2019 is incorporated herein by reference in its entirety.

BACKGROUND

Technological Field

The present invention relates to an information processing apparatus, an image forming apparatus, an information processing system, an attribute identification method, and a recording medium.

Description of the Related Art

In recent years, technologies have been known that estimate the attributes and interests of users on the basis of logs indicating access histories on the Internet, and distribute information suitable for the users on whom the estimations have been made.

For example, a system estimating an area where a user resides, on the basis of an IP address assigned to a user terminal, has been known. For example, Japanese Patent No. 3254422 discloses a method that includes a database associating IP addresses with areas, determines a user's originating area using an IP address assigned to the user terminal, selects web information on the basis of the determined area, and performs distribution.

For example, a system has been known that selects information having a high possibility of interesting the user, on the basis of the IP address. For example, JP 2017-126215A describes a method that identifies a user belonging to a common social group on the basis of the IP address, and selects information to be provided for the other users belonging to the same social group, on the basis of a behavior history of the identified user.

Although in Japanese Patent No. 3254422 areas can be obtained on the basis of IP addresses, the attributes other than the areas cannot be obtained.

Although in JP 2017-126215A a user belonging to the common social group can be identified on the basis of the IP address, the attributes of the social group to which the user belongs (called social group attributes of the user) cannot be identified.

SUMMARY

The present invention has been made in view of the situations described above and has an object to allow correct identification of the social group attributes of the user of the user terminal connected via a communication network.

To achieve at least one of the abovementioned objects, according to an aspect of the present invention, an information processing apparatus connected to one or more user terminals including a first user terminal installed at a place of a social group, via a communication network, the information processing apparatus reflecting one aspect of the present invention comprises:

a storage that stores social group attribute information that associates a unique ID uniquely identifying the first user terminal with attribute information pertaining to the social group where the first user terminal assigned the unique ID is installed; and a hardware processor, wherein the hardware processor obtains information pertaining to the first user terminal and including the unique ID, the information having been transmitted from the first user terminal, and obtains the attribute information pertaining to the social group associated in the storage with the unique ID transmitted from the first user terminal and identifies a social group attribute of the user of the first user terminal.

According to another aspect of the present invention, an image forming apparatus includes the information processing apparatus.

According to another aspect of the present invention, an information processing system includes one or more user terminals including a first user terminal installed at a place of a social group, and an information processing apparatus connected to each other via a communication network, wherein the first user terminal is assigned a unique ID uniquely identifying the first user terminal, and transmits, to the information processing apparatus, the information pertaining to the first user terminal and including the unique ID, the information processing apparatus includes:
  a storage that stores social group attribute information that
    associates a unique ID with attribute information pertaining to the social group where the first user terminal assigned the unique ID is installed; and
  a hardware processor, and
  the hardware processor obtains information pertaining to the first user terminal and including the unique ID, the information having been transmitted from the first user terminal, and
    obtains the attribute information pertaining to the social group associated in the storage with the unique ID transmitted from the first user terminal and identifies a social group attribute of the user of the first user terminal.

According to another aspect of the present invention, a method of identifying an attribute of a user of a first user terminal in an information processing apparatus connected to one or more user terminals including a first user terminal installed at a place of a social group, via a communication network, wherein the information processing apparatus comprises a storage that stores social group attribute information that associates a unique ID uniquely identifying the first user terminal with attribute information pertaining to the social group where the first user terminal assigned the unique ID is installed, the method includes:
  obtaining information pertaining to the first user terminal and including the unique ID, the information having been transmitted from the first user terminal; and
  obtaining the attribute information pertaining to the social group associated in the storage with the unique ID transmitted from the first user terminal, and identifying a social group attribute of the user of the first user terminal.

According to another aspect of the present invention, a computer-readable recording medium stores a program for causing a computer functioning as an information processing apparatus connected to one or more user terminals including a first user terminal installed at a place of a social group via a communication network, to perform:

storing social group attribute information that associates a unique ID uniquely identifying the first user terminal with attribute information pertaining to the social group where the first user terminal assigned the unique ID is installed; and obtaining information pertaining to the first user terminal and including the unique ID, the information having been transmitted from the first user terminal, and obtaining the attribute information pertaining to the social group associated in the storage with the unique ID transmitted from the first user terminal, and identifying a social group attribute of the user of the first user terminal.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein:

FIG. 3 shows a data configuration example of social group attribute information;

FIG. 4 shows a data configuration example of first history information;

FIG. 5 shows a data configuration example of second history information;

FIG. 6 shows a data configuration example of conversion information;

FIG. 7 shows a data configuration example of integrated history information;

FIG. 8 shows a data configuration example of distribution information;

DETAILED DESCRIPTION OF THE EMBODIMENTS

Hereinafter, one or more embodiments of the present invention will be described in detail with reference to the drawings. However, the scope of the invention is not limited to the illustrated embodiments.

First, a configuration of an embodiment of the present invention is described.

Figure 1:
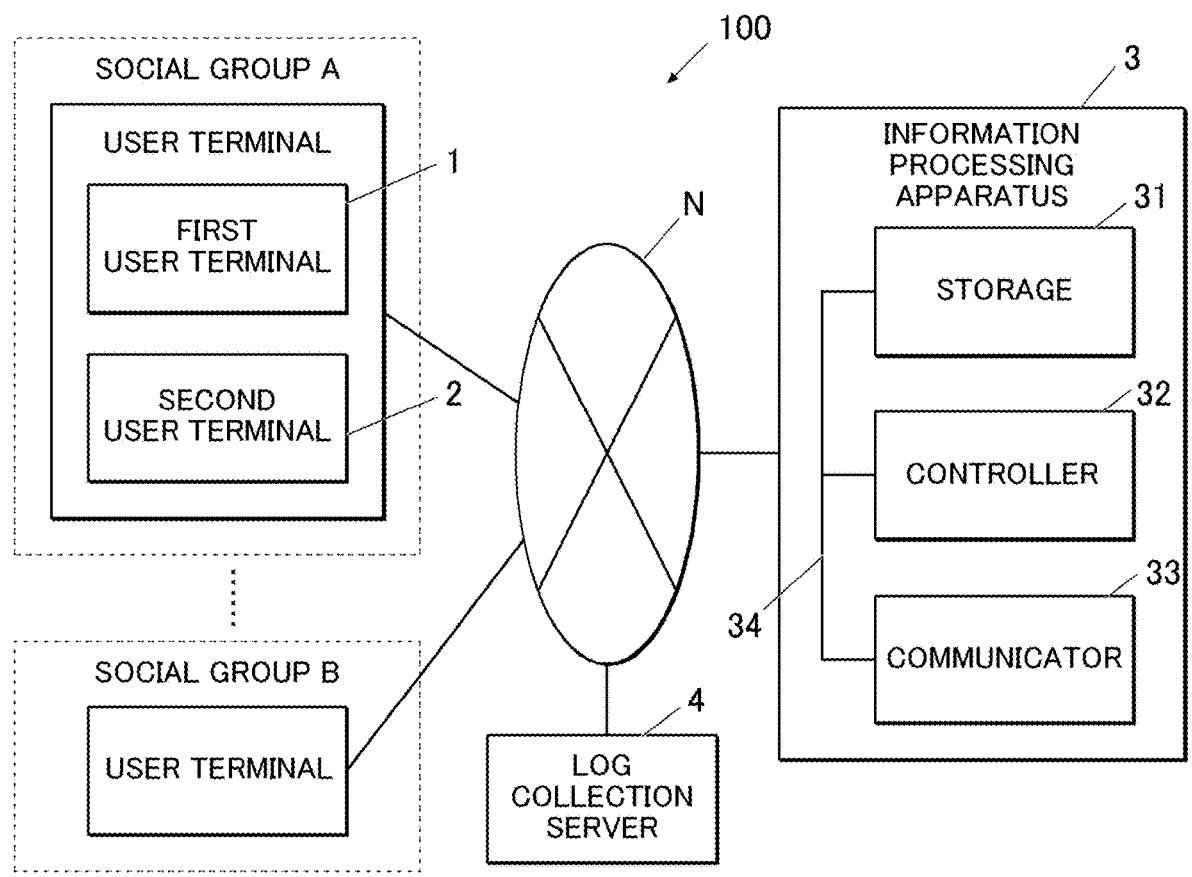
FIG. 1 shows the entire configuration of an information processing system in an embodiment of the present invention.

FIG. 1 shows an entire configuration example of an information processing system 100 in this embodiment.

As shown in FIG. 1, the information processing system 100 includes user terminals (a first user terminal 1 and a second user terminal 2) used by users belonging to social groups such as a social group A and a social group B, for example, and an information processing apparatus 3, and a log collection server 4, which are connectable via the Internet N. The number of user terminals including the first user terminal 1 and the second user terminal 2 is not specifically limited.

The social groups are groups of people sharing an object, a space or the like, and may include, for example, an organization, a circle, a family, users of facilities, residents of a condominium.

The first user terminal 1 is a terminal installed at a place of a social group (a place for activities of the social group), and may be, for example, an image forming apparatus such as a multifunction machine, a wireless LAN router, a smart speaker or the like. The first user terminal 1 is assigned a unique ID that can uniquely identify the first user terminal 1.

The first user terminal 1 includes: a controller that includes a central processing unit (CPU) and a random access memory (RAM); a storage that includes a hard disk drive (HDD) and a semiconductor memory; an operation unit; a display; and a communicator that includes a network interface. In a case where the first user terminal 1 is a multifunction machine, this terminal further includes: an image scanner (scanner) that reads an image of an original; and a printer that forms an image on a sheet on the basis of print data transmitted from an external PC or the like via the communicator. In a case where the first user terminal 1 is a smart speaker, the operation unit and the display are a microphone and a speaker, respectively.

The controller of the first user terminal 1 stores, in the storage, log information that includes a use history of the own apparatus, and assigns predetermined information to the log information accumulated in the storage and transmits the information as first history information (see FIG. 4) to the information processing apparatus 3 through the communicator at a predetermined time interval.

The second user terminal 2 is an information processing terminal used at a place of each social group by users belonging to the social group, and is, for example, a PC, a smartphone, a tablet terminal or the like. The aforementioned unique ID is not assigned to the second user terminal 2. The second user terminal 2 may be movable or immovable.

Similar to the first user terminal 1, the second user terminal 2 includes a controller, a storage, an operation unit, a display, and a communicator.

The information processing apparatus 3 is an apparatus that identifies the social group attributes of users using the first user terminal 1 and the second user terminal 2. The social group attributes of the users include, for example, not only the names of social groups to which users belong, but also locations, phone numbers, and business details (in a case of a corporation). In this embodiment, description is made using an example of a case where the information processing apparatus 3 is a single apparatus. Alternatively, it may be assumed that this apparatus may include functionally distributed apparatuses.

As shown in FIG. 1, the information processing apparatus 3 includes a storage 31, a controller 32, and a communicator 33, which are connected via a bus 34.

The storage 31 includes an HDD and a semiconductor memory, and stores programs for allowing the controller 32 to execute various processes, and parameters, files and the like that are required to execute the programs.

Figure 2:
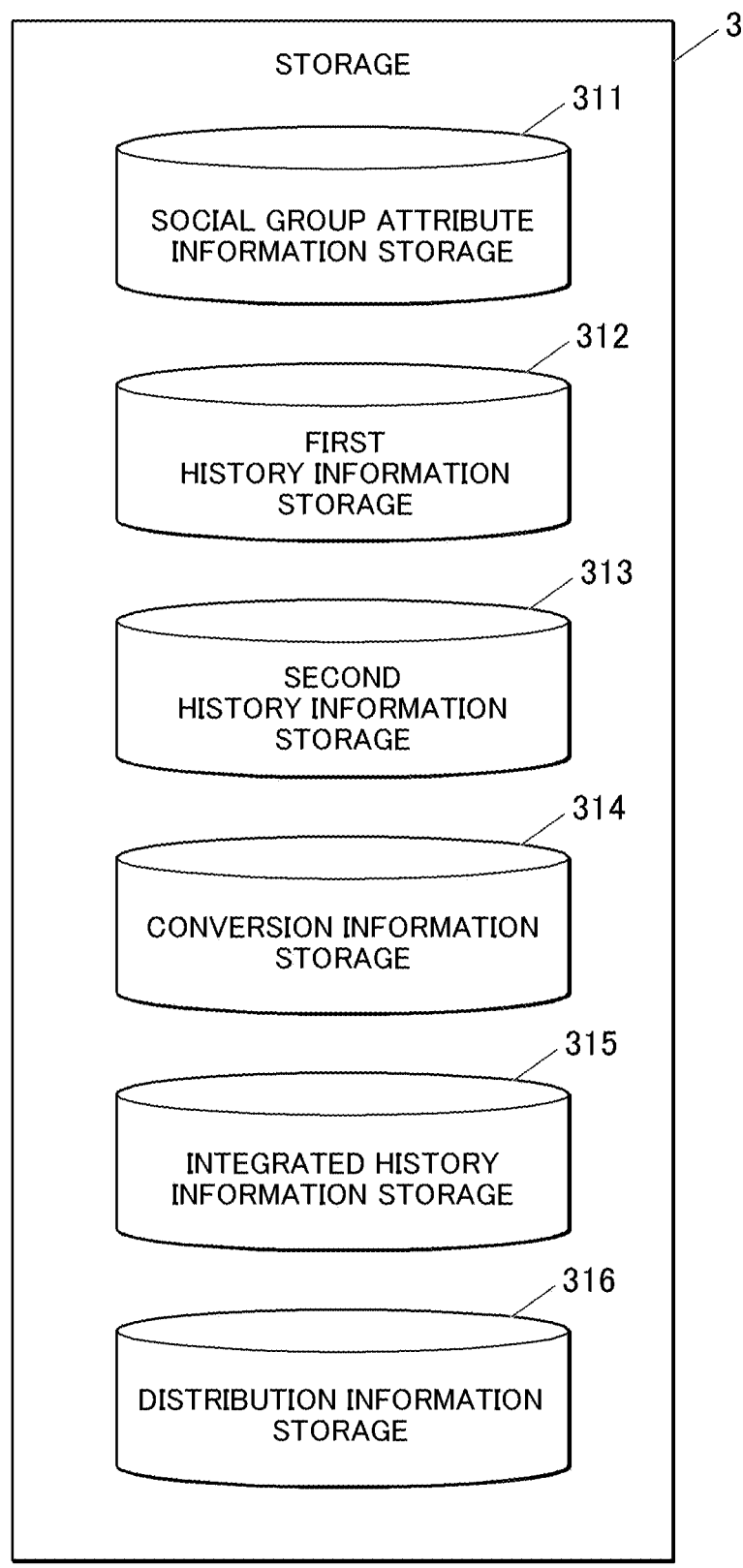
FIG. 2 shows a configuration of a storage in FIG. 1.

As shown in FIG. 2, the storage 31 includes a social group attribute information storage 311, a first history information storage 312, a second history information storage 313, a conversion information storage 314, an integrated history information storage 315, and a distribution information storage 316.

The social group attribute information storage 311 stores social group attribute information that associates the unique ID uniquely identifying the first user terminal 1 with attribute information pertaining to the social group where the first user terminal 1 identified by the unique ID is installed. For example, as shown in FIG. 3, the social group attribute information includes the aforementioned unique ID, and the attribute information pertaining to the social group. The unique ID is identification information on the first user terminal 1. The attribute information pertaining to the social group is not specifically limited only if the information can identify the attribute of the social group where the first user terminal 1 is installed. In this embodiment, the information is assumed to be contracting party information on a contracting party having a contract for installation of the first user terminal 1, and various disclosed data items. The contracting party information is information on the contracting party of the contract of installation of the first user terminal 1 (for example, the name of the contracting party, location, phone number, etc.). The disclosed data items are disclosed data on the contracting party (for example, the business details of the contracting party, the number of members, etc.). Based on the contracting party information on the contracting party of installation of the first user terminal 1 and on disclosed data items, the social group attribute of the user of the first user terminal 1 can be identified. For example, if the contracting party is Tokyo business office of A corporation, the user of the first user terminal 1 is identified to be a staff member at Tokyo business office of A corporation. For example, if the contracting party is a shopping mall, the user of the first user terminal 1 is identified to be a customer of the shopping mall.

The first history information storage 312 stores the first history information transmitted from the first user terminal 1. For example, as shown in FIG. 4, the first history information includes a unique ID, an IP address, log information, and date and time. The unique ID is a unique ID of the first user terminal 1. The IP address is a global IP address that is assigned when connection to the Internet N is established for transmission by the first user terminal 1 transmitting the first history information. The log information is information that includes the use history of the first user terminal 1 (user information and the like on the user having used the terminal). The date and time is a date and time when the information processing apparatus 3 received the first history information. Alternatively, the date and time may be a date and time of transmission of the first history information by the first user terminal 1.

The second history information storage 313 stores second history information that is history information pertaining to when the second user terminal 2 accessed a website. As shown in FIG. 5, the second history information includes an IP address, a device fingerprint, log information, and date and time. The IP address is a global IP address assigned to the second user terminal 2 when the website was accessed. The device fingerprint is a data string that the website can obtain from the web browser, is made up of a combination of communication basic information on the second user terminal 2, terminal information, browser information and the like, and is information that can substantially identify a personal terminal. The log information is a web browsing history of access by the second user terminal 2 to the website, and includes, for example, a connection URL, a content attribute (category), registration information (membership registration information on the website etc.), and purchase data. The date and time is, for example, a date and time when the second user terminal 2 accessed the website.

The conversion information storage 314 stores conversion information (see FIG. 6) that associates the unique ID, the IP address, and the date and time of the first history information with each other.

The integrated history information storage 315 stores integrated history information where information pertaining to social group attributes is added to the first history information and the second history information. As shown in FIG. 7, the integrated history information includes the date and time, the unique ID, IP address, contracting party information, various disclosed data items, and log information.

The distribution information storage 316 stores distribution information, such as advertisements to be distributed. As shown in FIG. 8, the distribution information includes the category, distribution condition, and distribution information (content etc.). The category is information indicating the classification of content to be distributed, and may be, for example, real estate, travel, food, costumes, music, job transfer, etc. The category may be classification with multiple hierarchical levels. The distribution condition is a social group attribute of a user to whom distribution is to be made, the user attribute and the like. The distribution information is content information, such as on advertisements to be distributed.

The controller 32 includes a CPU, and a RAM, and integrally controls each element of the information processing apparatus 3. The controller 32 reads various programs stored in the storage 31 and deploys the programs on the RAM, and executes after-mentioned various processes according to the programs; the processes include a process on the information processing apparatus 3 side in a first history information registration process, a process on the information processing apparatus 3 side in a second history information registration process, an integrated history information creation process, an information distribution process A, and an information distribution process B.

The communicator 33 includes a network interface, and transmits and receives data to and from external apparatuses wiredly or wirelessly connected via the Internet N.

The log collection server 4 obtains the log information when the second user terminal 2 accessed the website and transmits the information to the information processing apparatus 3. The log collection server 4 includes a controller, a storage, and a communicator.

In this embodiment, the IP address (global IP address) of the information processing apparatus 3 is assumed to be a fixed address. Alternatively, the address may be a dynamically assigned varying address. In the case where the IP address is dynamically assigned, use of a dynamic domain name system (DNS) allows access to the information processing apparatus 3 from an external apparatus, such as a user terminal, through designation of the URL (domain name) of the information processing apparatus 3.

Next, the operation of the information processing system 100 is described.

(First History Information Registration Process)

Figure 9:
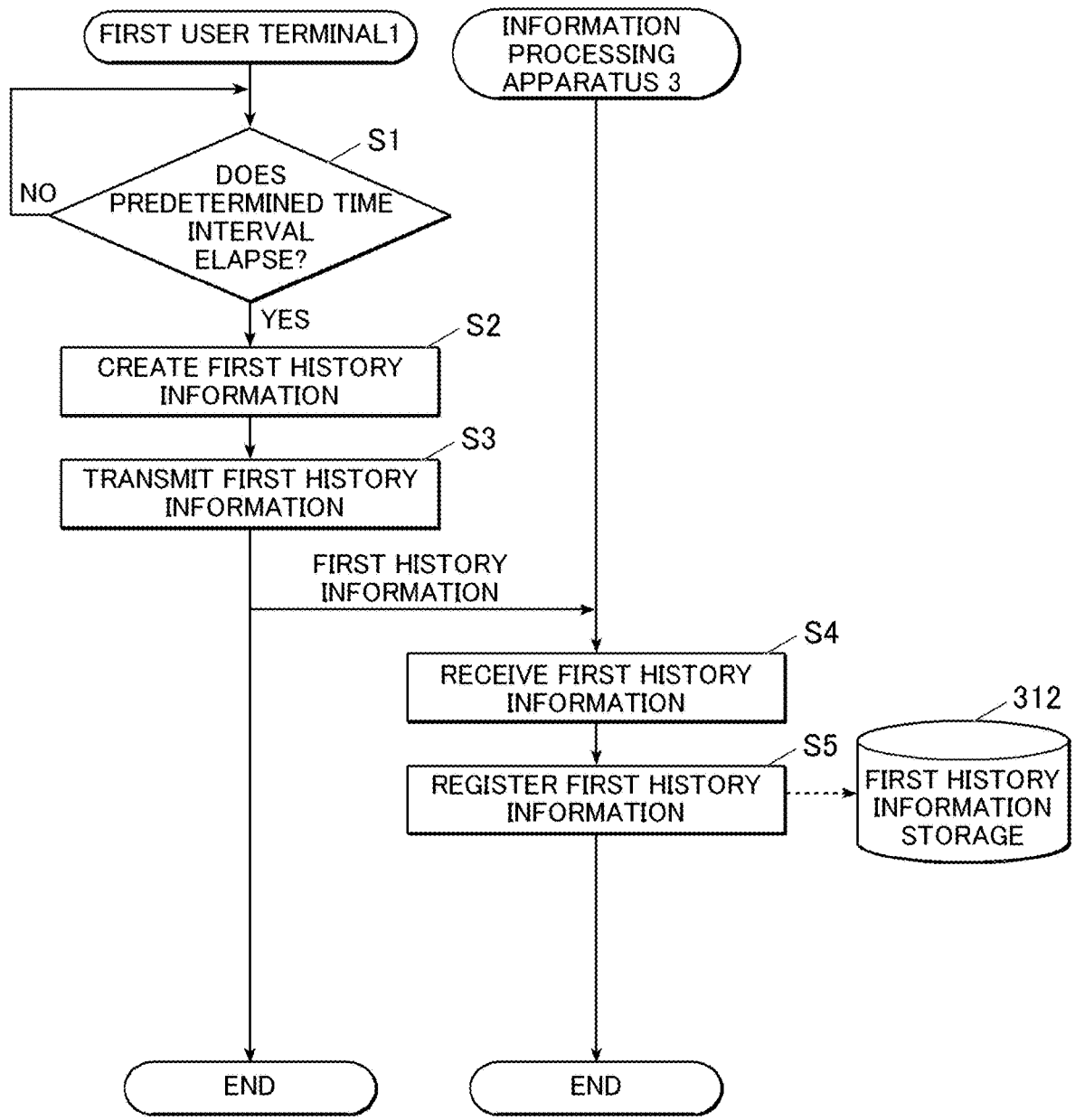
FIG. 9 is a ladder chart showing a flow of a first history information registration process.

FIG. 9 is a flowchart showing the first history information registration process executed between the first user terminal 1 and the information processing apparatus 3. The process on the first user terminal 1 side in the first history information registration process is executed through cooperation between the controller of the first user terminal 1 and the programs stored in the storage. The process on the information processing apparatus 3 side in the first history information registration process is executed through corporation between the controller 32 of the information processing apparatus 3 and the programs stored in the storage 31. The first history information registration process is executed at a predetermined time interval. Execution of the first history information registration process allows the controller 32 to function as a first information obtainer.

If a predetermined time interval elapses (Step S1; YES), the first user terminal 1 creates the first history information (Step S2).

That is, the first user terminal 1 reads the log information stored in the storage of the own apparatus and creates the first history information that includes the unique ID of the own apparatus and the log information.

Here, in a case where the first user terminal 1 is a multifunction machine and setting of user authentication at a time of printing is configured, the controller of the first user terminal 1 obtains, as the log information, the user information (for example, the gender or the like estimated from the department, position, and name in a case of a corporation) identified from user authentication. Accordingly, the attributes of the user using the first user terminal 1 can be obtained. In a case where the first user terminal 1 is installed in a corporation, a proposal destination corporation name, a title, a presentation date and time and the like are often described on a printed matter. Accordingly, these print content items may be obtained as the log information. For example, after an optical character recognition (OCR) process is executed for the printed matter, natural language processing is performed, and proposal content is estimated from the title on a cover. The proposal destination is estimated from "Dear", "Mr." and the like. Accordingly, the user attributes, such as the department and the current interest of the user using the first user terminal 1, can be obtained from the printed matter. When the first user terminal 1 creates the first history information, this terminal obtains pieces of information on the operation situations of the own apparatus, ambient environmental light, room temperature and the like, and creates the first history information that includes these pieces of information as the log information. Accordingly, information on whether or not the office or a facility where the first user terminal 1 is currently installed is in an in-operation time slot, can be transmitted to the information processing apparatus 3.

Next, the first user terminal 1 transmits the created first history information to the information processing apparatus 3 via the Internet N (Step S3).

Here, the first user terminal 1 adds, to the first history information, the IP address assigned at the time of connection to the Internet N and transmits the assigned information to the information processing apparatus 3.

In the information processing apparatus 3, upon receipt of the first history information transmitted from the first user terminal 1 by the communicator 33 (Step S4), the controller 32 assigns the date and time to the received first history information and registers the assigned information in the first history information storage 312 (Step S5), and finishes the first history information registration process.

(Second History Information Registration Process)

Figure 10:
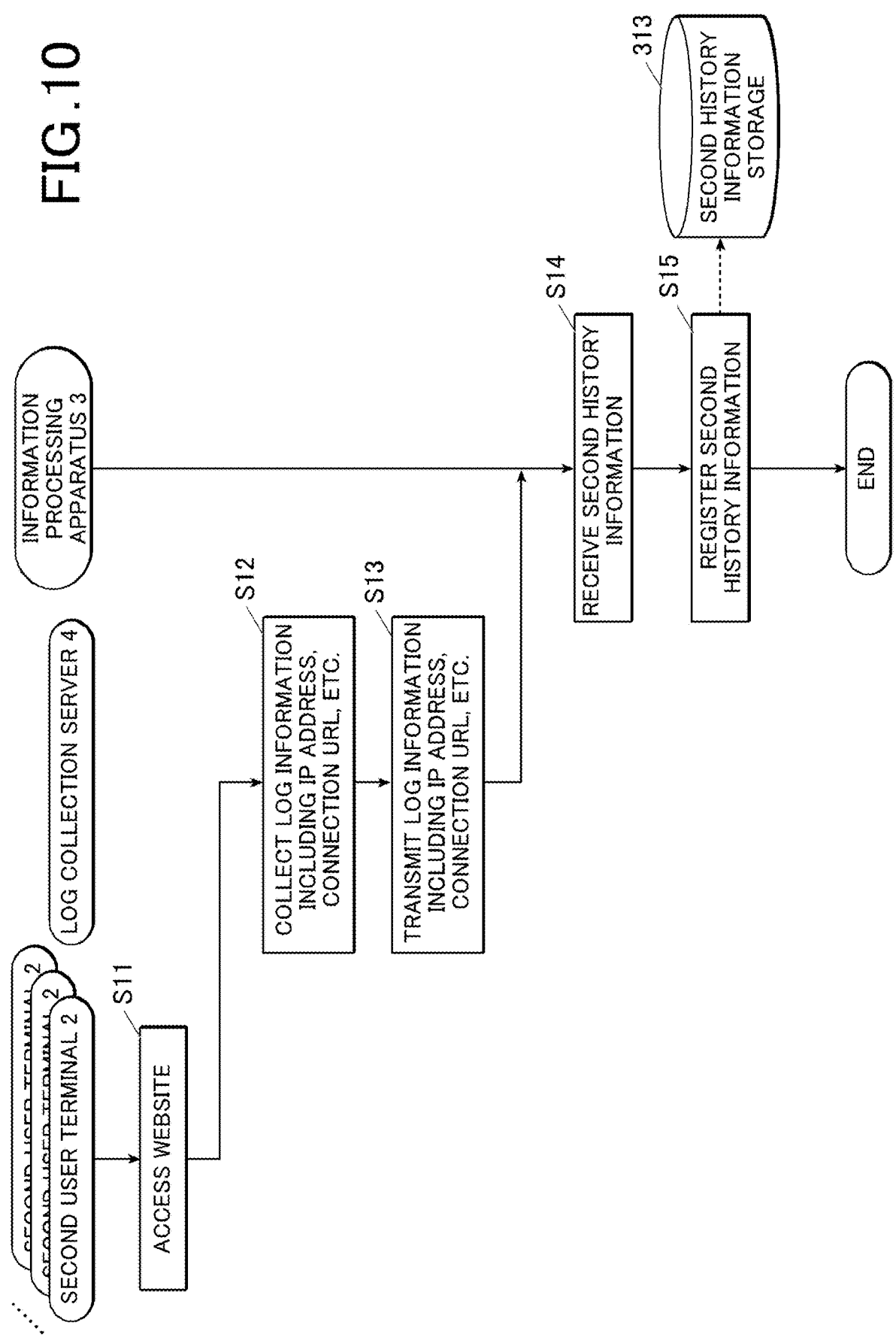
FIG. 10 is a ladder chart showing a flow of a second history information registration process.

FIG. 10 is a flowchart showing the second history information registration process executed between the second user terminal 2, the log collection server 4, and the information processing apparatus 3. The process on the second user terminal 2 side in the second history information registration process is executed through cooperation between the controller of the second user terminal 2 and the programs stored in the storage. The process on the information processing apparatus 3 side in the second history information registration process is executed through corporation between the controller 32 and the programs stored in the storage 31. The process on the log collection server 4 side in the second history information registration process is executed through corporation between the controller of the log collection server 4 and the programs stored in the storage. Execution of the second history information registration process allows the controller 32 to function as a second information obtainer.

If the second user terminal 2 accesses the website via the Internet N (Step S11), the log collection server 4 obtains the IP address of the second user terminal 2, the device fingerprint, the access date and time, and the log information (for example, the access URL, the content attribute, registration information, purchase data on the user of the second user terminal 2 and the like) (Step S12). The obtained IP address, the device fingerprint, and the date and time, and the log information are then transmitted to the information processing apparatus 3 via the Internet N (Step S13).

The IP address of the second user terminal 2, the device fingerprint, the access date and time, and the log information are automatically transmitted to the log collection server 4 by means of a tag embedded in the website accessed by the second user terminal 2, for example. The purchase data can be obtained by, for example, the log collection server 4 cooperating with an EC site browsed by the user.

In the information processing apparatus 3, if the IP address of the second user terminal 2, the device fingerprint, the log information, and the date and time transmitted from the log collection server 4 are received by the communicator 33 (Step S14), the controller 32 registers the received information, as the second history information on the second user terminal 2, in the second history information storage 313, and finishes the second history information registration process.

(Integrated History Information Creation Process)

Figure 11:
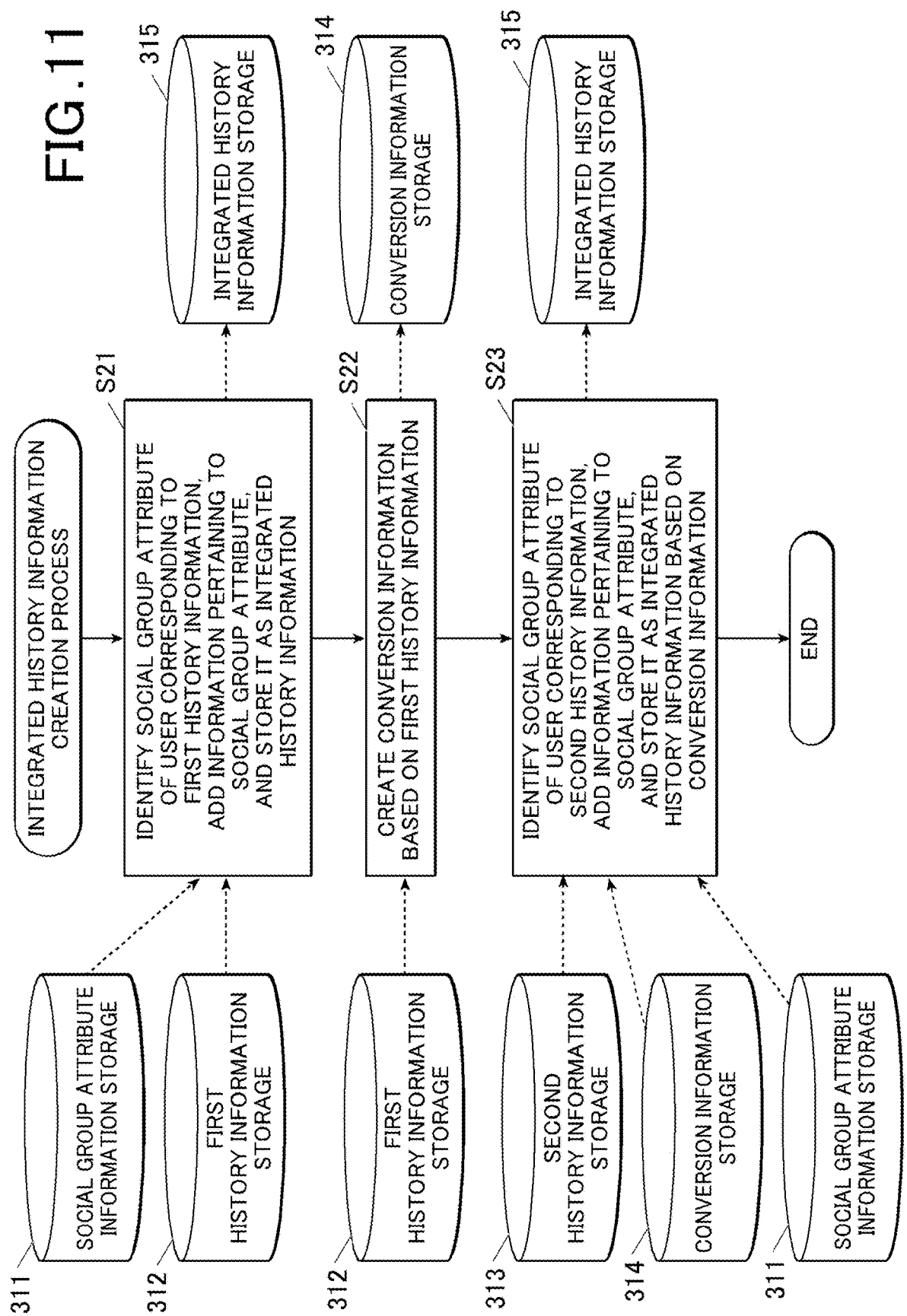
FIG. 11 is a flowchart showing a flow of an integrated history information creation process.

FIG. 11 is a flowchart showing the integrated history information creation process executed through corporation between the controller 32 of the information processing apparatus 3 and the programs stored in the storage 31. The integrated history information creation process is executed as needed (for example, every time the first history information or the second history information is received) or at a predetermined time interval. Execution of the integrated history information creation process allows the controller 32 to function as a first attribute identifier, a conversion information creator, a unique ID obtainer, a second attribute identifier, and an integrated history information creator.

First, for each piece of the first history information stored in the first history information storage 312, the controller 32 identifies the social group attribute of the user of the first user terminal 1 corresponding to the first history information concerned, creates the integrated history information by adding the information pertaining to the identified social group attribute to first history information concerned, and stores the information in the integrated history information storage 315 (Step S21).

Figure 12:
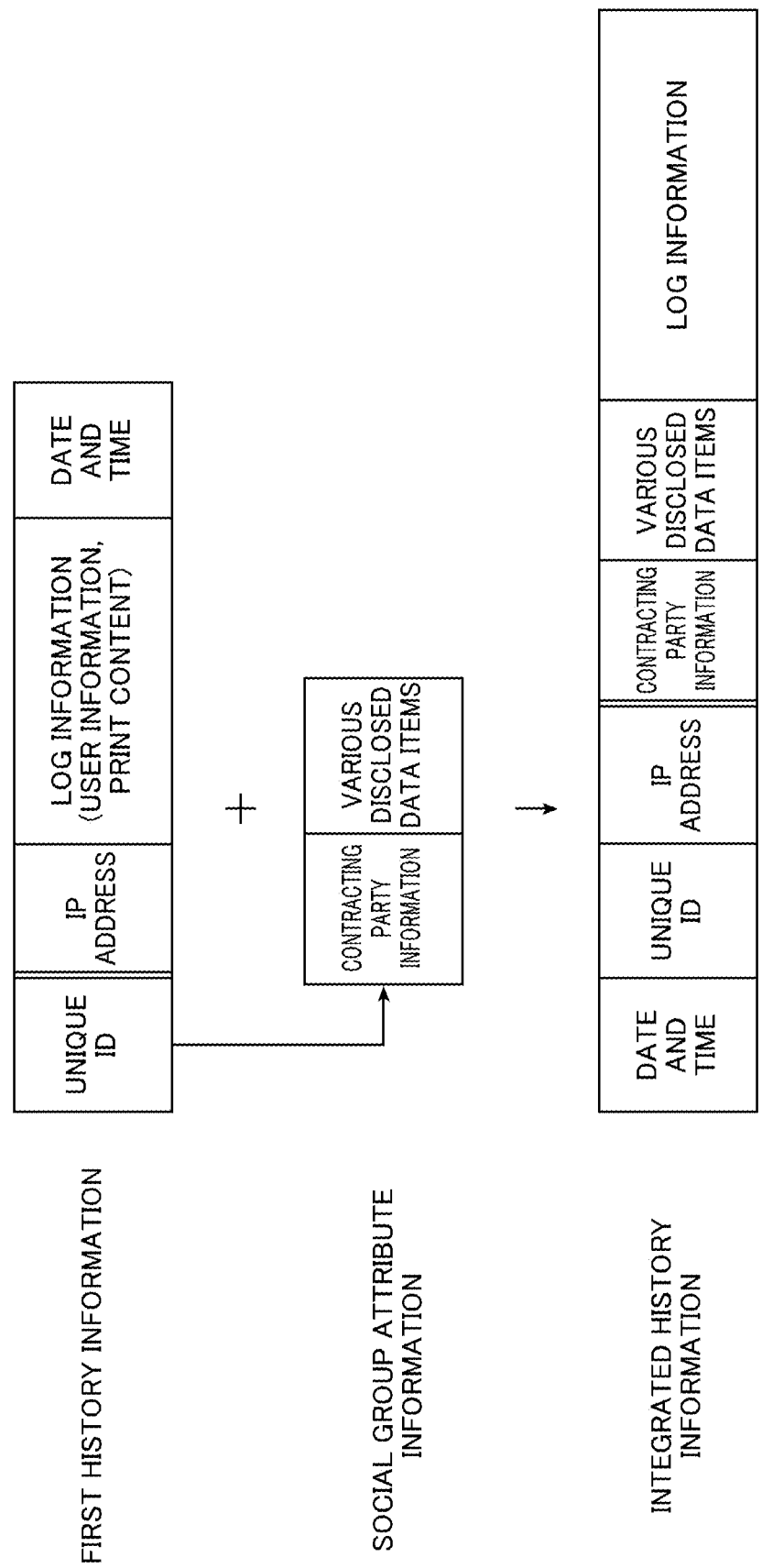
FIG. 12 shows creation procedures of creating integrated history information from the first history information.

In Step S21, as shown in FIG. 12, the controller 32 obtains, from the social group attribute information storage 311, the attribute information (the contracting party information, and various disclosed data items) pertaining to the social group associated with the unique ID included in each piece of first history information stored in the first history information storage 312, identifies the obtained attribute information pertaining to the social group as information pertaining to the social group attribute of the user of the first user terminal 1 corresponding to the piece of first history information, and adds the identified information to the first history information, thereby creating the integrated history information. The created integrated history information is recorded in the integrated history information storage 315.

Next, the controller 32 creates conversion information on the basis of the first history information and stores the information in the conversion information storage 314 (Step S22).

Specifically, the unique ID, the IP address, and the date and time in the first history information stored in the first history information storage 312 are obtained, and the conversion information is created and stored in the conversion information storage 314.

Here, the IP address used for communication through the Internet N sometimes varies in view of the upper limit number of IP addresses and of privacy. Conventionally, it has been difficult to identify the social group from the IP address. In this embodiment, the conversion information that associates the unique ID, the IP address, and the date and time with each other, and is stored in the conversion information storage 314, which can identify not only current but also past social groups from the combination of the date and time and the IP address.

Next, for each piece of the second history information stored in the second history information storage 313, the controller 32 identifies the social group attribute of the user of the second user terminal 2 corresponding to the second history information, creates the integrated history information by adding the information pertaining to the identified social group attribute to second history information concerned, and stores the information in the integrated history information storage 315 (Step S23), and finishes the integrated history information creation process.

Figure 13:
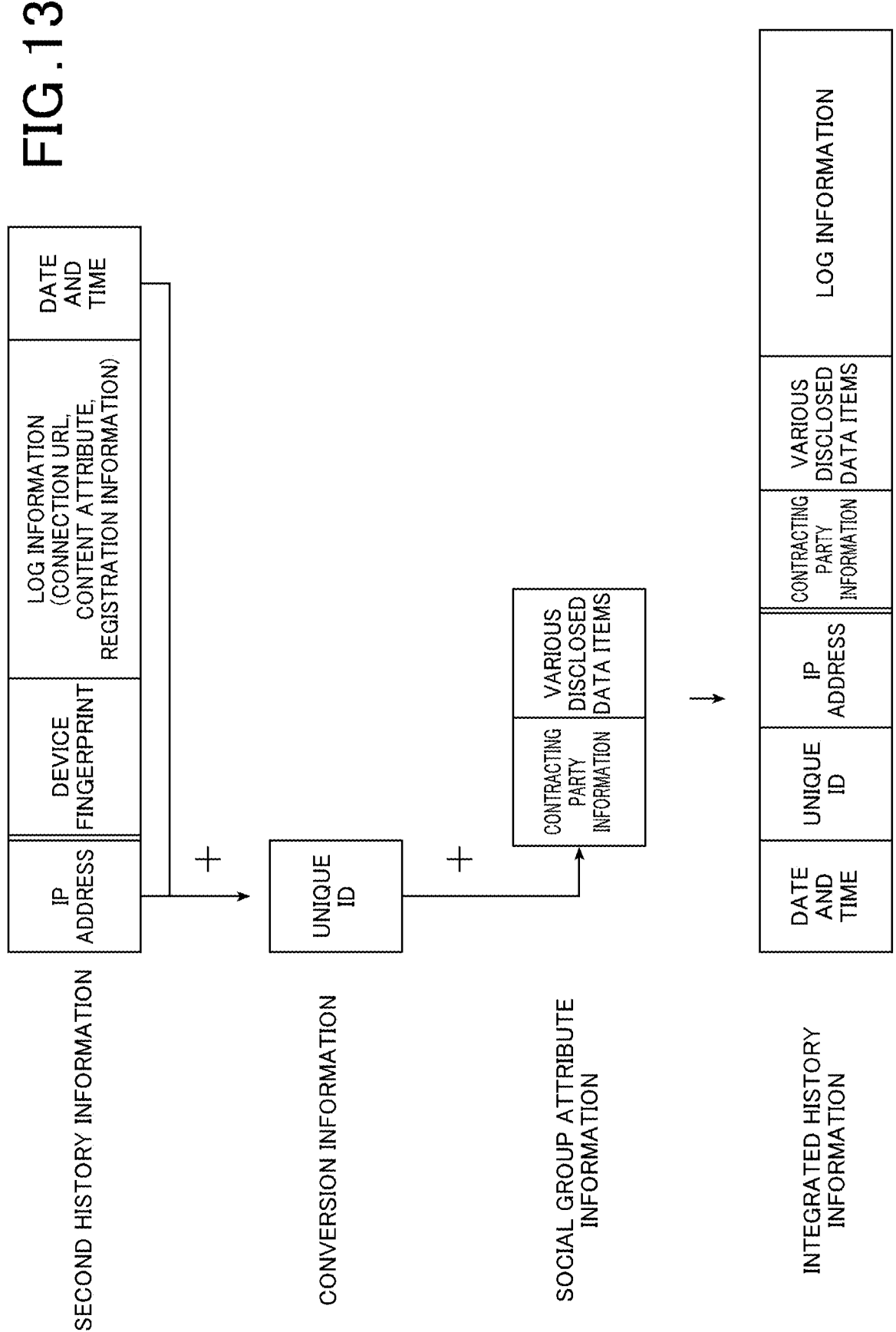
FIG. 13 shows creation procedures of creating the integrated history information from the second history information.

In Step S23, as shown in FIG. 13, the controller 32 obtains, from the conversion information storage 314, the unique ID associated with the IP address and the date and time included in each piece of second history information stored in the second history information storage 313 (having the IP address identical to that included in the second history information, and having the date and time closest to the date and time included in the second history information). Next, from the social group attribute information storage 311, the attribute information pertaining to the social group (the contracting party information, and various disclosed data items) corresponding to the obtained unique ID is obtained, and the obtained attribute information pertaining to the social group is identified as the information pertaining to the social group attribute of the user of the second user terminal 2 corresponding to the second history information and is added to the second history information, thereby creating the integrated history information. To align the format, the device fingerprint is included in the log. The created integrated history information is stored in the integrated history information storage 315.

As described above, also for the user of the second user terminal 2 assigned no unique ID, reference to the conversion information allows the social group attribute of the user of the second user terminal 2 to be identified on the basis of the IP address and the date and time included in the second history information.

Preferably, after the integrated history information creation process, the first history information and the second history information with which the integrated history information has been created is assigned flags indicating completion of creation, thus excluding the pieces of information from the next integrated history information creation process.

Figure 14:
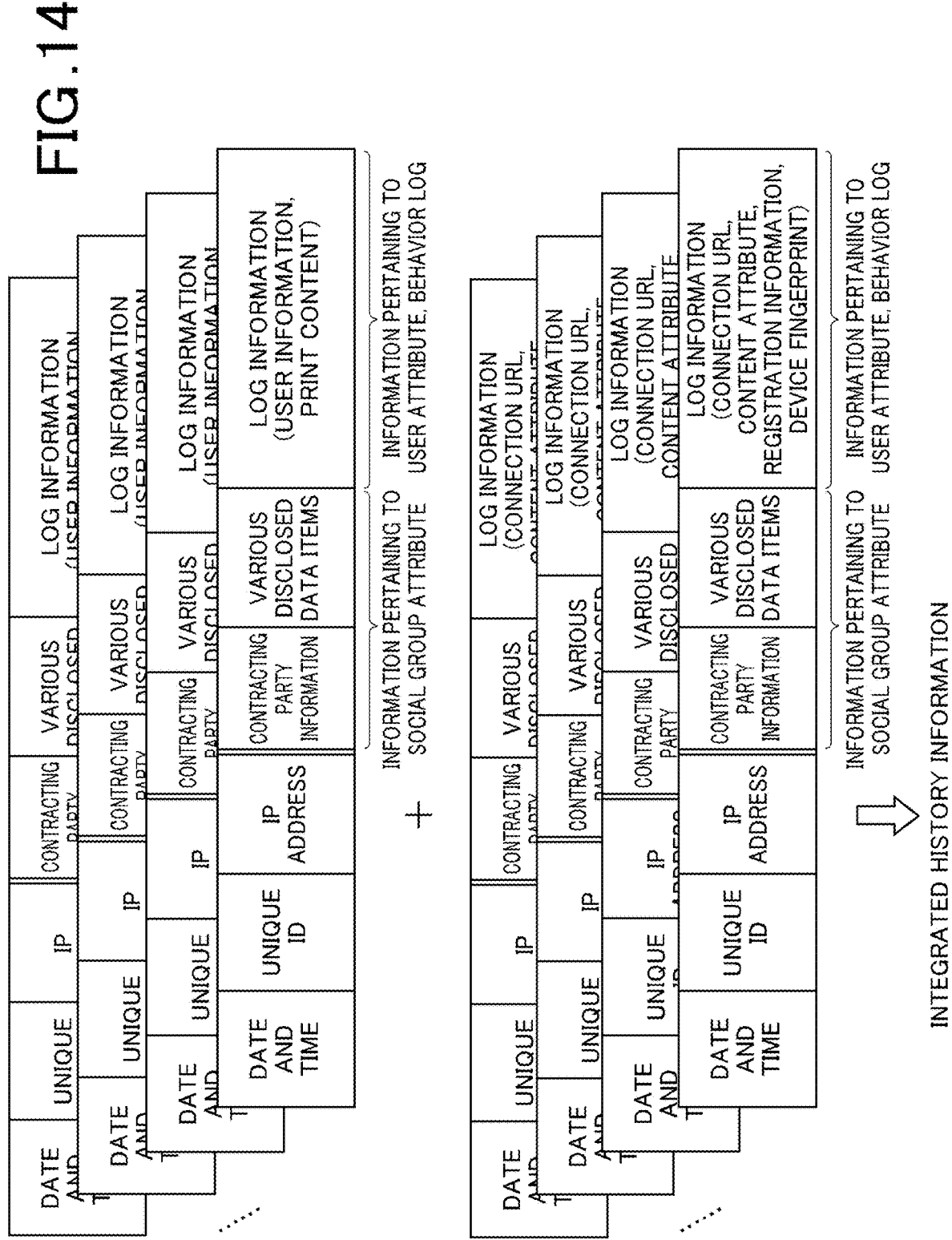
FIG. 14 schematically shows data stored in integrated history information storage.

FIG. 14 shows creation results of the integrated history information through the integrated history information creation process. As shown in FIG. 14, the integrated history information includes information pertaining to the social group attributes of the user using the first user terminal 1 and the user using the second user terminal 2 (the contracting party information, and disclosed data items), the user attributes (the content attribute, the registration information, the device fingerprint, the user information, print content, etc.), and information pertaining to a behavior log (the connection URL, purchase data, etc.).

Here, if information is distributed from an advertiser, users estimated to be interested in the advertisement are required to be extracted from among many users in order to achieve maximization of cost-effectiveness. The integrated history information includes the social group attributes, the user attributes and the behavior log of the user of the first user terminal 1 and the user of the second user terminal 2. Accordingly, based on the various attributes and the behavior log, the information can be more appropriately separated into segments and distributed, which can improve the advertising effectiveness. For example, the following (1) to (4) examples can be discussed as an example of the segment.

(1) Identical Social Group

For example, users belonging to the same corporation or the same condominium are estimated to have similar annual incomes and life styles. Accordingly, content accessed multiple times from the user terminals of the users belonging to the same social group can be estimated to interest commonly the users belonging to the social group. For example, if staff members in Tokyo sales department of A corporation are viewing content of a customer management system, it is assumed that other users in the Tokyo sales department of A corporation are also unsatisfied with the customer management system of the corporation and are interested in this content. Accordingly, more effective advertisement distribution can be achieved by distributing similar content to the other terminals without access to the content among those of the users having the same social group attribute (i.e., belonging to the same social group).

(2) Similar Social Group

In cases of similar industry segments or similar values in residential areas, the annual incomes and life styles are considered to be similar. Accordingly, it can be assumed that users belonging to competitors that are similar social groups are also interested in the content and introduced services accessed multiple times by the user terminals in A corporation. Accordingly, more effective advertisement distribution can be achieved by distributing content similar to the content accessed multiple times in A corporation to the competitors.

(3) Social Group Attribute×Behavior Log, or User Attribute×Behavior Log

For example, segments can be separated on the basis of social group attribute×behavior log, or user attribute×behavior log, such as members in manufacturers viewing the customer management system, and sales staff members viewing the customer management system.

(4) Social Group Attribute×User Attribute×Behavior Log

For example, segments can be separated on the basis of social group attribute×user attribute×behavior log, such as sales staff members in manufacturers viewing the customer management system.

(Information Distribution Process)

Hereinafter, an information distribution process using integrated history information is described. Information is distributed by the information processing system 100 described above, according to a case where (1) the user terminals that are information distribution targets are predetermined, and distribution information suitable for the users is determined and is distributed, and a case where (2) distribution information is predetermined, the user terminals of users suitable for the distribution condition of the distribution information are determined, and the information is distributed.

Figure 15:
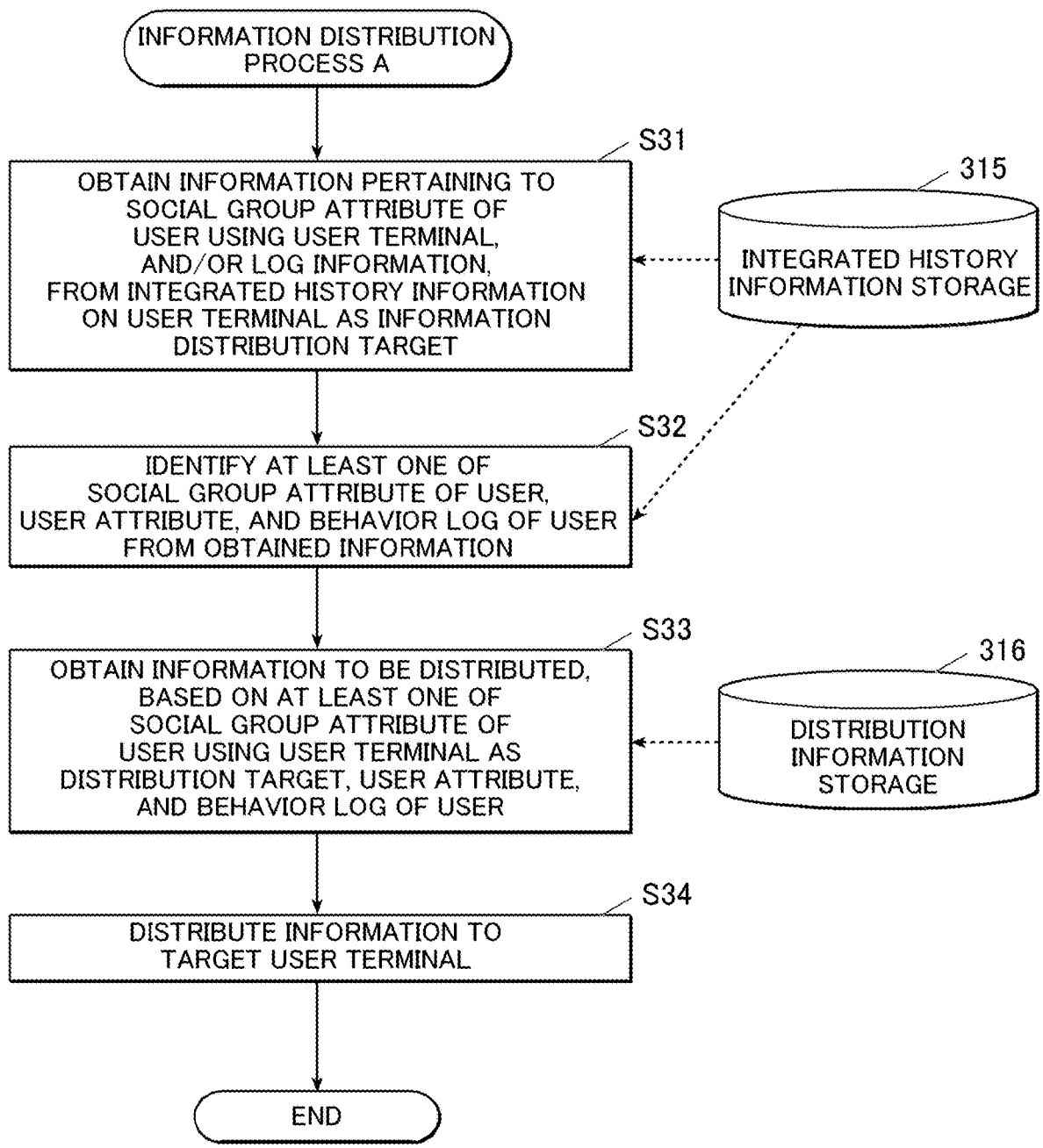
FIG. 15 is a flowchart showing a flow of an information distribution process A.

First, operations of the information processing apparatus 3 in the aforementioned case (1) are described. FIG. 15 is a flowchart showing the information distribution process A executed through corporation between the controller 32 of the information processing apparatus 3 and the programs stored in the storage 31. Execution of the information distribution process A allows the controller 32 to function as an information distributor.

In the information distribution process A, first, the controller 32 reads, from the integrated history information storage 315, the integrated history information from the user terminal that is the information distribution target (which may be the first user terminal 1 or the second user terminal 2), and obtains information pertaining to the social group attribute of the user using the user terminal, and/or the log information, from the read integrated history information (Step S31).

Next, from the obtained information, the controller 32 identifies at least one of the social group attribute of the user of the user terminal that is the information distribution target, the user attribute, and the behavior log of the user (Step S32).

Next, based on at least one of the identified social group attribute, user attribute, and behavior log of the user, the controller 32 determines distribution information to be distributed, and obtains the information from the distribution information storage 316 (Step S33).

The controller 32 then distributes the obtained distribution information to the user terminal that is the information distribution target (Step S34), and finishes the information distribution process A.

For example, if information is distributed to the user terminal having a certain unique ID, the controller 32 obtains the integrated history information on the certain unique ID (or IP address) from the integrated history information storage 315 in Step S31, and identifies the social group attribute of the user of the user terminal that is the information distribution target, from the information that pertains to the social group attribute and is included in the integrated history information in Step S32. The distribution information where the identified social group attribute serves as the distribution condition is then read from the distribution information storage 316 and distributes the information. Accordingly, the information in conformity with the social group attribute of the user using the user terminal can be distributed. For example, if the social group attribute of the user of the user terminal that is the information distribution target is A corporation, distribution of coupon information on eating and drinking places around A corporation, and distribution of information related to the business details of A corporation can be performed.

In Step S32, based on pieces of integrated history information on the identical unique ID (or IP address), a user attribute or a behavior log common to the users belonging to the identical social group is identified. In Step S33, based on at least one of the identified user attribute and behavior log, distribution information to be distributed to the user terminal having the unique ID (IP address), and the user terminals having similar social group attributes (for example, the user terminals in the same business type pertaining to the social group attribute) may be determined. Accordingly, appropriate information can be distributed, for the users, to the user terminals having the same or similar social group attributes where analogous interests and behaviors are considered to be shared.

For example, if the user attribute (department) identified from pieces of integrated history information obtained from the first user terminal 1 having a certain unique ID is sales, the first user terminal 1 can be estimated to be installed in the sales department. Accordingly, information for the sales department is distributed to the first user terminal 1. For example, if the behavior log identified from pieces of integrated history information obtained from the second user terminals 2 connected from B division of A corporation includes a browsing history of the URL of a site pertaining to the customer management system, the other users in B division of A corporation can be estimated to be also interested in the customer management system. Accordingly, the content of the customer management system is distributed to the user terminal having the same IP address.

If the second user terminal 2 is assumed as the distribution target, the same second user terminal 2 can be identified on the basis of the device fingerprint or the like. Accordingly, as described above, based on the social group attribute of the user, social group attribute×user attribute, or social group attribute×behavior log, the distribution information may be determined. Alternatively, based only on the user attribute or the behavior log, the distribution information may be determined. Accordingly, information suitable for the user can be distributed.

It can be determined whether the integrated history information is one created based on the same second user terminal 2 or not, from only the device fingerprint, or from the IP address and the device fingerprint.

Next, operations of the information processing apparatus 3 in the aforementioned case (2) are described.

Figure 16:
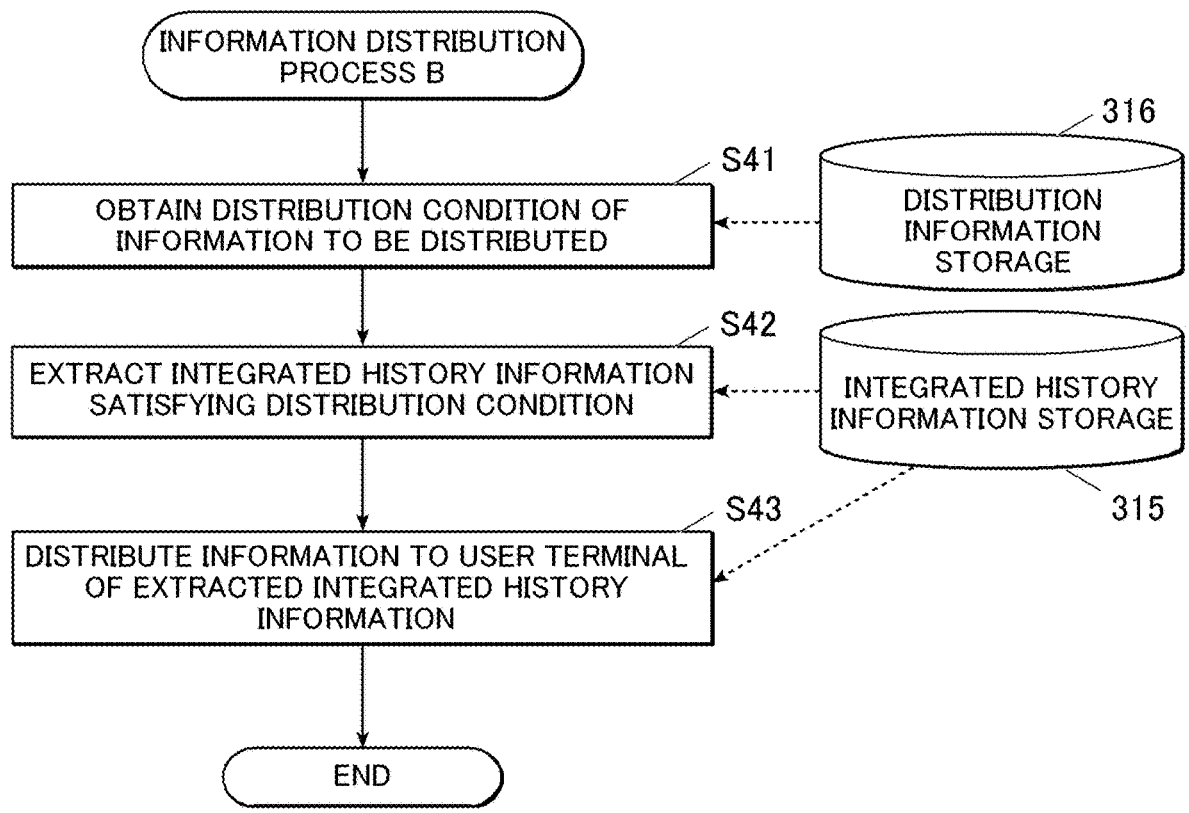
FIG. 16 is a flowchart showing a flow of an information distribution process B.

FIG. 16 is a flowchart showing the information distribution process B executed through corporation between the controller 32 of the information processing apparatus 3 and the programs stored in the storage 31.

In the information distribution process B, first, the controller 32 obtains, from the distribution information storage 316, the distribution condition of the distribution information to be distributed (Step S41).

Next, the controller 32 extracts the integrated history information satisfying the distribution condition, from the integrated history information storage 315 (Step S42).

The controller 32 then distributes the distribution information to the user terminal corresponding to the extracted integrated history information (Step S43), and finishes the information distribution process B.

According to the information distribution process B described above, the distribution information can be distributed to the user terminal of the user satisfying the distribution condition. As described above, the integrated history information includes the information pertaining to the social group attributes of the users of the first user terminal 1 and the second user terminal 2, the information pertaining to the user attributes, and the information pertaining to the behavior log. Accordingly, the distribution condition can be specifically set in conformity with the information to be distributed.

Hereinafter, an output example of distribution information is described.

(Output of Distribution Information in Multifunction Machine)

First, an example of output of the distribution information in a case where the first user terminal 1 is a multifunction machine is described.

In the case where the first user terminal 1 is a multifunction machine, a frame (advertisement frame) preliminarily provided in print data to display the distribution information may be recognized and then the distribution information (advertisement) preliminarily distributed from the information processing apparatus 3 may be printed in the advertisement frame of a printed matter.

For example, in transmission of the print data from a PC or the like to the multifunction machine, a code (for example, a barcode, QR Code®, etc.) allowing the multifunction machine to recognize the advertisement frame is added to a range in the advertisement frame designated by the user of the print data and then the data is transmitted, which allows the controller of the multifunction machine to recognize the advertisement frame through the code, and print the distribution information (advertisement) in the advertisement frame on the printed matter.

Accordingly, organizations (for example, schools, city halls, smaller businesses, etc.) that find a problem in printing cost can print the distribution information without unnecessary printing cost. Preferably, in this case, the number of successes in printing is collected as a log in the storage of the multifunction machine to allow charging for the advertiser on a success-fee basis.

The multifunction machine includes a display provided with a touch panel. Accordingly, the distribution information may be displayed on the display. Preferably, in this case, the controller performs estimation with reference to a required time period for printing and selects and displays a piece of distribution information having a size reproducible in the required time period for printing.

An information output button or the like may be included in the distribution information. If the information output button displayed on the display is pressed, the controller of the multifunction machine may transmit email or the like about information (detailed information etc.) related to the distribution information to the PC having transmitted print data, or may print information related to the distribution information. Alternatively, if the displayed distribution information is, for example, information pertaining to eating and drinking places, various transport facilities, etc., a reservation screen or the like may be displayed on the display (for example, transition to a reservation site) upon pressing of the information output button, thus allowing a reservation operation.

The controller of the multifunction machine may obtain the user attribute of the user having pressed the information output button, for example, from user authentication, and utilize the attribute for information distribution thereafter, or may count the number of users having pressed the information output button and use the number for charging the advertiser.

As described above, if the first user terminal 1 is an image forming apparatus, such as a multifunction machine, a printed matter or the display of the own apparatus can be used to distribute information, such as on advertisements, to the user using the image forming apparatus.

The distribution information may be distributed as direct mail (DM) in a non-operational time slot of the multifunction machine from the information processing apparatus 3, and the distribution information may be printed through the multifunction machine. Preferably, in this case, the information processing apparatus 3 collects the advertiser of the distribution information, and the number of successes of distribution, as a log, and charges on a success-fee basis. It can be determined whether it is in a non-operational time slot or not, on the basis of the operation situations included in the log information on the first history information and transmitted, and information on ambient environmental light and the like.

(Online to Offline (O2O) Tracking Advertisement)

The integrated history information can identify "which user" belonging to "which social group" "is communicating from which place". Accordingly, Online to Offline (O2O) tracking advertisement can be displayed, and marketing can be automatically achieved.

For example, after the information processing apparatus 3 obtains the second history information and creates the integrated history information, the controller 32 may use the integrated history information to display an O2O cooperation tracking advertisement through cooperation between the web browsing history and digital signage.

For example, information on the browsed website is displayed on a digital signage (display device) belonging to the IP address included in the created integrated history information. Alternatively, the location of the user is identified from the information pertaining to the social group attribute included in the integrated history information, and the information on the browsed website is displayed on a digital signage at a station therearound or commercial facilities. This can impress the user with the information on the website. Note that only the information on the browsed website, but also information related to the browsed website and information according to the user attribute may be displayed.

Alternatively, the information on a place from which the second user terminal 2 communicates (i.e., the IP address of the integrated history information and the social group attribute information) may be used for cooperation with the content of the website. For example, if a communication place estimated from the information pertaining to the social group attribute included in the integrated history information is a shopping mall, a coupon for a customer assumed to visit the shopping mall next time may be displayed on the website.

(Automatization of Marketing)

Marketing may be automatically executed using the interests and purchase data on users having common social group attribute and user attribute (for example, the sales department of A corporation).

For example, the integrated history information may be used to estimate the behavior common to the user group having a similar or identical social group attribute and an identical user attribute (for example, website browsing and purchase behaviors) (for example, if the browsing number in the history or the number of purchases is equal to or larger than a predetermined threshold, it is estimated to be a common behavior), and according to the estimated behavior, telephone appointment, DM distribution, or advertisement distribution may be performed for the users having a similar or identical social group attribute and an identical user attribute. For example, if multiple staff members in Tokyo sales department of A corporation are viewing the content of the customer management system, telephone appointment, DM distribution or advertisement distribution about information related to the customer management system may be performed for the users belonging to Tokyo sales department of A corporation. Phone numbers and addresses can be obtained from contracting party information in the social group attribute information, and disclosed data items.

(Modified Example of Information Processing System 100)

In the embodiment described above, the description has been made where the information processing apparatus 3 is separated from the first user terminal 1. Alternatively, the information processing apparatus 3 may be embedded in any first user terminal 1 installed in any of social groups. For example, if the first user terminal 1 is an image forming apparatus, such as a multifunction machine, the functions of the information processing apparatus 3 may be embedded in the image forming apparatus. If the image forming apparatus embedded with the information processing apparatus 3 is the first user terminal that is the distribution target of distribution information, the controller of this apparatus prints the distribution information on a printed matter or displays the information on the display, as described above. As described above, distribution of the information through the printed matter or the display of the own apparatus allows the information, such as advertisements, to be distributed to the user using the image forming apparatus.

Preferably, in this case, the controller 32 obtains the distribution information from an external information distribution server at predetermined time intervals and stores the obtained distribution information in the distribution information storage 316. Accordingly, the latest distribution information can be reflected and held.

As described above, the information processing apparatus 3 includes the social group attribute information storage 311 that stores the social group attribute information associating a unique ID uniquely identifying the first user terminal 1 installed in a place of a social group with attribute information pertaining to the social group where the first user terminal 1 assigned the unique ID is installed. The controller 32 obtains the first history information that includes log information that includes the unique ID, IP address and the use history of the first user terminal and has been transmitted from the first user terminal 1. The attribute information pertaining to the social group associated in the social group attribute information storage 311 with the unique ID transmitted from the first user terminal 1 is obtained, and the social group attribute of the user of the first user terminal 1 is identified.

Consequently, the social group attribute of the user of the first user terminal 1 connected via the communication network can be correctly identified.

The controller 32 associates the unique ID, IP address, and date and time information included in the first history information with each other, creates the conversion information, and accumulates and stores the information in the conversion information storage 314, and obtains the IP address, device fingerprint, log information pertaining to web browsing, and date and time information when the second user terminal 2 accesses the website, as the second history information, and then refers to the conversion information stored in the conversion information storage 314, and obtains the unique ID corresponding to the IP address and the date and time information included in the obtained second history information. In the social group attribute information storage 311, the attribute information pertaining to the social group associated with the obtained unique ID is obtained, and the social group attribute of the user of the second user terminal 2 is identified.

Consequently, the social group attribute of the user using the second user terminal 2 assigned no unique ID can be correctly identified.

The controller 32 adds information pertaining to the social group attribute identified with respect to the user, to the first history information stored in the first history information storage 312 and the second history information stored in the second history information storage 313, creates the integrated history information, and stores the information in the integrated history information storage 315. Based on the integrated history information stored in the integrated history information storage 315, the piece of distribution information related to the user of the user terminal that is the information distribution target is obtained from among the pieces of distribution information stored in the distribution information storage 316, and the obtained piece of distribution information is distributed to the user terminal that is the information distribution target.

Accordingly, since the database storing the integrated history information that includes the social group attributes, user attributes and behavior logs of the first user terminal 1 and the second user terminal 2 are created, information distribution suitable for the users can be achieved.

For example, based on the information pertaining to the social group attribute included in the integrated history information stored in the integrated history information storage 315 and/or the log information, the controller 32 identifies at least one of the social group attribute, user attribute, and behavior log of the user of the user terminal that is the information distribution target, obtains the piece of distribution information related to at least one of the social group attribute, user attribute and behavior log identified from the pieces of distribution information stored in the distribution information storage, and distributes the obtained piece of distribution information to the user terminal that is the information distribution target.

Consequently, information distribution that is according to the social group attribute, user attribute, or behavior log of the user of the user terminal that is the information distribution target, or a combination of two or more thereof, and is suitable for the user can be achieved.

Based on the information pertaining to the social group of the integrated history information stored in the integrated history information storage 315 and the log information, the controller 32 identifies the user attribute and/or behavior log common to the users of the user terminals having the same social group attribute, obtains the piece of distribution information related to the identified user attribute and/or behavior log from among the pieces of distribution information stored in the distribution information storage 316, and distributes the obtained piece of distribution information to the user terminals having the identical or similar social group attributes.

Consequently, appropriate information can be distributed, for the users of the user terminals having the same or similar social group attributes where analogous interests and behaviors are considered to be shared.

Based on the information pertaining to the social group attribute included in the integrated history information or the IP address, the controller 32 estimates the location of the user of the user terminal, and distributes distribution information in conformity with the user attribute and/or behavior log of the user terminal, to the display device adjacent to the estimated position of the user.

Consequently, the information suitable for the user of the user terminal can be displayed on the display device adjacent to the location of the user, thus allowing the user to be impressed.

The description in this embodiment is an example of a preferable information processing apparatus according to the present invention. There is no limitation thereto.

For example, in the embodiment described above, the controller 32 can identify the user attribute common to the users of the first user terminals 1 on the basis of the integrated history information. Alternatively, the user attribute common to the users of the first user terminals 1 may be identified on the basis of the log information included in the pieces of first history information accumulated in the first history information storage 312.

Likewise, based on the pieces of second history information accumulated in the second history information storage 313, the controller 32 may identify the user attribute and/or behavior log common to the users of the second user terminals 2 having the same social group attribute.

Likewise, based on the pieces of second history information accumulated in the second history information storage 313, the controller 32 may identify the user attribute and/or behavior log of the users using the second user terminals.

For example, in the above description, the example is disclosed where a nonvolatile memory, such as a hard disk and a semiconductor memory, is used as a computer-readable medium for the program according to the present invention. There is no limitation to this example. Portable recording media, such as CD-ROM, may be applied as other computer-readable media. Carrier waves are also applied as a medium where data on the program according to the present invention is provided via a communication line.

Furthermore, the detailed configuration and detailed operation of each of apparatuses constituting the information processing system 100 can be appropriately changed in a range without departing from the spirit of the present invention. Although embodiments of the present invention have been described and illustrated in detail, the disclosed embodiments are made for purposes of illustration and example only and not limitation. The scope of the present invention should be interpreted by terms of the appended claims

What is claimed is:

1. An information processing apparatus connected to one or more user terminals including a first user terminal and a second user terminal installed at a place of a social group, via a communication network, said information processing apparatus comprising:
    a social group attribute information storage that stores social group attribute information that associates a unique terminal ID uniquely identifying the first user terminal with attribute information pertaining to the social group where the first user terminal assigned with the unique terminal ID is installed; and
    a hardware processor,
    wherein the hardware processor
        obtains information pertaining to the first user terminal and including the unique terminal ID and information of an IP address assigned for the first user terminal to connect to the communication network, the obtained information having been transmitted from the first user terminal,
        obtains the IP address used when the second user terminal accesses a website, and
        identifies a social group attribute of a user of the second user terminal based on (i) a relation between the unique terminal ID and the IP address included in the information pertaining to the first user terminal, and (ii) a relation between the unique terminal ID and the attribute information related to the social group stored in the social group attribute information storage by obtaining attribute information pertaining to the social group associated with the same unique terminal ID as the unique terminal ID corresponding to the obtained IP address.

2. The information processing apparatus according to claim 1, wherein
    the information pertaining to the first user terminal is first history information that includes the unique terminal ID and log information including a use history of the first user terminal, and
    the hardware processor accumulates and stores the obtained first history information in a first history information storage.

3. The information processing apparatus according to claim 2,
    wherein based on the log information included in the first history information accumulated in the first history information storage, the hardware processor identifies a user attribute common to a plurality of users of the first user terminal.

4. The information processing apparatus according to claim 1, wherein the hardware processor (i) obtains, as secondary history information, the IP address used when the second user terminal accesses the website and log information pertaining to web browsing browsed when the second user terminal accesses the website, and accumulates and stores the obtained second history information in a second history information storage, and iii) identifies a user attribute and/or a behavior log common to a plurality of users of the second user terminal having an identical social group attribute, based on pieces of the second history information accumulated in the second history information storage.

5. The information processing apparatus according to claim 1, wherein
    the hardware processor obtains the IP address used when the second user terminal accesses the website and log information pertaining to web browsing browsed when the second user terminal accesses the website as second history information and accumulates and stores the obtained second history information in a second history information storage, and
    the hardware processor identifies a user attribute and/or a behavior log of the user using the second user terminal, based on the second history information accumulated in the second history information storage.

6. The information processing apparatus according to claim 1,
    wherein
    the information pertaining to the first user terminal is first history information including the unique terminal ID and log information including use history of the first user terminal,
    the hardware processor accumulates and stores the obtained first history information in a first history information storage,
    the hardware processor obtains, as second history information, the IP address used when the second user terminal accesses a website and log information pertaining to web browsing browsed when the second user terminal accesses the website, and the hardware processor adds information pertaining to the social group attribute identified with respect to the user, to the first history information stored in the first history information storage and the second history information stored in a second history information storage, creates integrated history information, and stores the created information in an integrated history information storage, wherein the information processing apparatus further comprises a distribution information storage that stores distribution information in a plurality of categories, and based on the integrated history information stored in the integrated history information storage, the hardware processor obtains a piece of the distribution information related to the user of the user terminal that is an information distribution target from among the pieces of distribution information stored in the distribution information storage, and distributes the obtained piece of distribution information to the user terminal that is the information distribution target.

7. The information processing apparatus according to claim 6, wherein based on the information pertaining to the social group attribute included in the integrated history information stored in the integrated history information storage and/or the log information, the hardware processor identifies at least one of the social group attribute, user attribute, and behavior log of the user of the user terminal that is the information distribution target, obtains a piece of the distribution information related to at least one of the social group attribute, user attribute and behavior log identified from among the pieces of distribution information stored in the distribution information storage, and distributes the obtained piece of distribution information to the user terminal that is the information distribution target.

8. The information processing apparatus according to claim 6, wherein based on the information pertaining to the social group in the integrated history information stored in the integrated history information storage and the log information, the hardware processor identifies the user attribute and/or behavior log common to the users of the user terminal having the identical social group attribute, obtains a piece of the distribution information related to the identified user attribute and/or behavior log from among the pieces of distribution information stored in the distribution information storage, and distributes the obtained piece of distribution information to the user terminal of the user having a social group attribute identical or a similar to the social group attribute.

9. The information processing apparatus according to claim 6, wherein based on the attribute information pertaining to the social group included in the integrated history information or the IP address, the hardware processor estimates a location of the user of the user terminal, and distributes distribution information in conformity with the user attribute and/or behavior log of the user terminal, to a display device adjacent to the estimated location of the user.

10. The information processing apparatus according to claim 1, wherein the hardware processor stores the obtained information pertaining to the first user terminal as first history information including date and time information in a first history information storage, the hardware processor obtains the IP address used when the second user terminal accesses the website and the date and time information showing when the second user terminal accesses the website as second history information, and the hardware processor identifies the social group attribute of the user of the second user terminal based on a relation among the unique terminal ID, the IP address and the date and time information included in the first history information and the relation between the unique terminal ID and the attribute information pertaining to the social group stored in the social group attribute information storage by obtaining the attribute information pertaining to the social group associated with the same unique terminal ID as the unique terminal ID corresponding to the IP address and the date and time information included in the second history information.

11. The information processing apparatus according to claim 10, wherein the hardware processor creates conversion information associating the unique terminal ID, the IP address and the date and time information included in the first history information, and accumulates and stores the conversion information in a conversion information storage, the hardware processor refers to the conversion information stored in the conversion information storage and obtains the unique terminal ID associated with the IP address and the date and time information included in the second history information, and the hardware processor identifies the social group attribute of the user of the second user terminal by obtaining the attribute information pertaining to the social group associated with the obtained unique terminal ID stored in the social group attribute information storage.

12. The information processing apparatus according to claim 1, wherein the hardware processor obtains the attribute information pertaining to the social group associated in the social group attribute information storage with the unique terminal ID transmitted from the first user terminal and identifies a social group attribute of the user of the first user terminal.

13. An image forming apparatus comprising the information processing apparatus according to claim 6.

14. The image forming apparatus according to claim 13, wherein the hardware processor prints, as a printed matter, the distribution information to be distributed by the image forming apparatus, or displays the distribution information on a display included in the image forming apparatus.

15. The image forming apparatus according to claim 13, wherein the hardware processor obtains the distribution information from an external information distribution server at predetermined time intervals, and the distribution information storage stores the obtained distribution information.

16. An information processing system in which one or more user terminals including a first user terminal installed at a place of a social group and a second user terminal, and an information processing apparatus are connected to each other via a communication network, wherein the first user terminal is assigned a unique terminal ID uniquely identifying the first user terminal, and transmits, to the information processing apparatus, the information pertaining to the first user terminal and including the unique terminal ID, the information processing apparatus comprises:

a social group attribute information storage that stores social group attribute information that associates a unique terminal ID with attribute information pertaining to the social group where the first user terminal assigned with the unique terminal ID is installed; and a hardware processor that obtains information pertaining to the first user terminal and including the unique terminal ID and information of an IP address assigned for the first user terminal to connect to the communication network, the obtained information having been transmitted from the first user terminal, obtains the IP address used when the second user terminal accesses a website, and identifies a social group attribute of a user of the second user terminal based on a relation between the unique terminal ID and the IP address included in the information pertaining to the first user terminal and the relation between the unique terminal ID and the attribute information related to the social group stored in the social group attribute information storage by obtaining attribute information pertaining to the social group associated with the same unique terminal ID as the unique terminal ID corresponding to the obtained IP address.

17. A method of identifying an attribute of a user of a second user terminal in an information processing apparatus connected to one or more user terminals including a first user terminal installed at a place of a social group and the second user terminal, via a communication network, the method including:

obtaining information pertaining to the first user terminal and including a unique terminal ID uniquely identifying the first user terminal and information of an IP address assigned for the first user terminal to connect to the communication network, the information having been transmitted from the first user terminal;

obtaining the IP address used when the second user terminal accesses a website, obtaining social group attribute information from a social group information storage storing social group attribute information in which attribute information pertaining to the social group where the first user terminal is installed is associated with the unique terminal ID, and identifying a social group attribute of a user of the second user terminal based on a relation between the unique terminal ID and the IP address included in the information pertaining to the first user terminal and the relation between the unique terminal ID and the attribute information related to the social group stored in the social group attribute information storage by obtaining attribute information pertaining to the social group associated with the same unique terminal ID as the unique terminal ID corresponding to the obtained IP address.

18. A non-transitory computer-readable recording medium storing a program for causing a computer functioning as an information processing apparatus to perform:

obtaining information pertaining to a first user terminal including a unique terminal ID uniquely identifying the first user terminal and information of an IP address assigned for the first user terminal to connect to the communication network, the obtained information having been transmitted from the first user terminal installed at a place of a social group, obtaining the IP address used when a second user terminal accesses a website, obtaining social group attribute information from a social group information storage storing social group attribute information in which attribute information pertaining to the social group where the first user terminal is installed is associated with the unique terminal ID, and identifying a social group attribute of a user of the second user terminal based on a relation between the unique terminal ID and the IP address included in the information pertaining to the first user terminal and the relation between the unique terminal ID and the attribute information related to the social group stored in the social group attribute information storage by obtaining attribute information pertaining to the social group associated with the same unique terminal ID as the unique terminal ID corresponding to the obtained IP address.

* * * * *